US009714092B2

(12) United States Patent
Herber et al.

(10) Patent No.: US 9,714,092 B2
(45) Date of Patent: Jul. 25, 2017

(54) TOWED ACTIVE AIRBORNE PLATFORM FOR DETERMINING MEASUREMENT DATA

(71) Applicant: ALFRED-WEGENER-INSTITUT HELMHOLTZ-ZENTRUM FUER POLAR- UND MEERESFORSCHUNG, Bremerhaven (DE)

(72) Inventors: Andreas Herber, Nordholz (DE); Dirk Kalmbach, Bremerhaven (DE); Ruediger Gerdes, Loxstedt (DE); James Bradley Watson, Brechin (CA)

(73) Assignee: ALFRED-WEGENER-INSTITUT HELMHOLTZZENTRUM FUER POLAR- UND MEERESFORSCHUNG, Bremerhaven (DE)

( * ) Notice: Subject to any disclaimer, the term of this patent is extended or adjusted under 35 U.S.C. 154(b) by 0 days.

(21) Appl. No.: 15/117,211

(22) PCT Filed: Jan. 24, 2015

(86) PCT No.: PCT/DE2015/000021
§ 371 (c)(1),
(2) Date: Aug. 8, 2016

(87) PCT Pub. No.: WO2015/117586
PCT Pub. Date: Aug. 13, 2015

(65) Prior Publication Data
US 2016/0355260 A1   Dec. 8, 2016

(30) Foreign Application Priority Data
Feb. 7, 2014   (DE) .................. 10 2014 001 873

(51) Int. Cl.
*B64D 3/00* (2006.01)
*B64C 13/16* (2006.01)
(Continued)

(52) U.S. Cl.
CPC .............. *B64D 3/00* (2013.01); *B64C 9/326* (2013.01); *B64C 13/16* (2013.01); *B64D 27/24* (2013.01);
(Continued)

(58) Field of Classification Search
CPC .... B64D 3/00; B64D 3/02; B64D 5/00; B64C 9/326; B64C 13/16; B64C 13/18;
(Continued)

(56) References Cited

U.S. PATENT DOCUMENTS

| 4,014,481 A | 3/1977 | Daikeler et al. |
| 6,111,327 A | 8/2000 | Bae et al. |

(Continued)

FOREIGN PATENT DOCUMENTS

| EP | 1422680 B1 | 5/2004 |
| EP | 2617647 A2 | 7/2013 |

(Continued)

OTHER PUBLICATIONS

W. Frey, et al., "A new airborne tandem platform for collocated measurements of microphysical cloud and radiation properties", Atmospheric Measurement Techniques, vol. 2, pp. 147-158, Dec. 2009.

(Continued)

*Primary Examiner* — Nicholas McFall
(74) *Attorney, Agent, or Firm* — Leydig, Voit & Mayer, Ltd.

(57) ABSTRACT

A cylindrical active airborne platform for determining measurement data is latchable to a carrying cable such that the airborne platform is towable through the air. Sensors are
(Continued)

configured to determine the measurement data and a flight position of the airborne platform. Two aerofoils arranged in the middle region of the airborne platform are adjustable and are connected to electrical adjusting devices configured as ailerons so as to vary a vertical flight position. Opposing two first air guide surfaces and two second air guide surfaces have further electrical adjusting devices configured respectively as elevators and as rudders. A computer-supported control device comprises an automatic flight management system that is configured to provide self-acting control of the vertical flight position of the airborne platform, and that is configured to control the further electrical adjusting devices.

15 Claims, 8 Drawing Sheets (51) Int. Cl.
| | | |
|---|---|---|
| B64C 9/32 | (2006.01) | |
| B64D 27/24 | (2006.01) | |
| B64D 45/00 | (2006.01) | |
| B64D 47/08 | (2006.01) | |
| B64C 9/00 | (2006.01) | |

(52) U.S. Cl.
CPC ............. *B64D 45/00* (2013.01); *B64D 47/08* (2013.01); *B64C 2009/005* (2013.01)

(58) Field of Classification Search
CPC ....... B64C 31/00; B64C 39/02; B64C 39/022; B64C 2201/066; B64C 2201/082; B64C 2201/12–2201/128; B64C 2201/145; F41J 9/10; F42B 10/60; F42B 10/62; F42B 10/64; G01V 3/16
See application file for complete search history.

(56) References Cited

U.S. PATENT DOCUMENTS

| | | | |
|---|---|---|---|
| 6,116,606 A | * | 9/2000 | Brum .................. F41J 9/10 244/1 TD |
| 6,765,383 B1 | | 7/2004 | Barringer |
| 2002/0190162 A1 | | 12/2002 | McDonnell |
| 2013/0062464 A1 | | 3/2013 | Speer |

FOREIGN PATENT DOCUMENTS

| | | |
|---|---|---|
| FR | 2521098 A1 | 8/1983 |
| JP | 09159397 A | 6/1997 |
| JP | 2000292097 A | 10/2000 |
| WO | WO 2013076708 A1 | 5/2013 |

OTHER PUBLICATIONS

Djamal Khelif, et al., Measurements of Air-Sea Fluxes with a Controlled Towed Vehicle (CTV), Office of Naval Research, pp. 1-27, Dec. 2010, URL: http://www.unols.org/meetings/2010/201002sco/201002scoap_09.pdf.

Gregory Kok "Controlled Towed Vehicle (CTV)" Flyer, Rev A from the company DMT, Conference of the American Geophysical Union AGU, Dec. 5-9, 2011, p. 1.

Gregory Kok, et al., "Measurement at the Air-Sea Interface with the Controlled Towed Vehicle", 20$^{th}$ Symposium on Boundary Layers and Turbulence respectively the 18$^{th}$ Conference on Air-Sea Interaction, Jul. 9, 2012, URL: http://ams.confex.com/ams/20BLT18AirSea/webprogram/Paper209425.html, pp. 1-13.

* cited by examiner

TOWED ACTIVE AIRBORNE PLATFORM FOR DETERMINING MEASUREMENT DATA

CROSS-REFERENCE TO PRIOR APPLICATIONS

This application is a U.S. National Stage Application under 35 U.S.C. §371 of International Application No. PCT/DE2015/000021 filed on Jan. 24, 2015, and claims benefit to German Patent Application No. DE 10 2014 001 873.3 filed on Feb. 7, 2014. The International Application was published in German on Aug. 13, 2015 as WO 2015/117586 A1 under PCT Article 21(2).

FIELD

The invention relates to a cylindrical active airborne platform for determining measurement data, which airborne platform by means of a carrying cable that is latchable in the middle region of the airborne platform is towable through the air by a powered aircraft, at least comprising:
sensors for determining the measurement data and the flight position of the airborne platform,
two aerofoils, arranged in the middle region of the airborne platform, which in order to vary the vertical flight position of the airborne platform are designed to be adjustable and are connected to electrical adjusting devices,
several air guide surfaces arranged in the rear region of the airborne platform radially on its longitudinal axis,
a computer-supported control device comprising an automatic flight management system at least for the self-acting control of the vertical flight position of the airborne platform, which flight management system comprises a malfunction module that is activated in the case of a malfunction, by means of which at least the electrical adjusting devices for the aerofoils can be moved to a non-deflected initial position, and comprising
rechargeable batteries for the supply of electrical power.

Due to occurring natural and artificial obstacles the options of non-contacting remote sensing with a powered aircraft, as a rule an aeroplane or a helicopter, in the atmospheric boundary layer, also known as the planetary boundary layer PBL (i.e. at an altitude range of between 0 and 300 m) is severely limited. In good conditions of visibility (no low-lying clouds or cloudless) measurements using an aircraft can be taken at 60 m (200 feet); in unfavourable conditions of visibility (low clouds, fog, rain etc.) only to a maximum of 300 m (1000 feet) altitude, in other words only on the edge of the PBL. For flight operations below 150 m (restricted category) stringent safety requirements apply to flight operations. However, measurements directly above the ground, for example directly above a sea ice surface, or below a cloud cover without direct visual contact to the aircraft are of particular interest. For such purposes airborne platforms are used that do not have their own propulsion systems (in contrast to drones) but instead are towed through the air by aircrafts flying in a non-critical altitude range above 300 m. The general direction of flight of the airborne platform is thus determined by the aircraft. In this arrangement the airborne platform is connected to the aircraft by means of a cable. With the use of a winch on the aircraft the cable is extended and retracted so that in the air the distance between the airborne platform and the aircraft can be varied. The extended cable can be up to 4000 m in length. In this arrangement a distinction should be made between passive airborne platforms, which have no manoeuvrability of their own and are towed through the air on a load cable that as a rule is latched to the nose of the airborne platform, and active airborne platforms, which are towed by the aircraft on a carrying cable that is latched to the airborne platform in the middle region and which within the general flight direction predetermined by the aircraft have their own manoeuvrability.

Such airborne platforms are, for example, used in polar regions in order to obtain information relating to the sea ice surface and the sea ice thickness distribution. However, such airborne platforms can also be used to carry out atmospheric measurements (content of black carbon BC, aerosols (particle concentrations, chemical composition), atmospheric trace gases ($CO$, $CO_2$, $SO_2$, $NO_x$) and to obtain information relating to meteorological conditions and the nature of clouds), geophysical prospecting and environmental monitoring (emissions from ships and power stations, as well as land mine detection) in accessible settled regions or industrial regions, but also in particularly inaccessible regions (polar regions, oceans, mountain ranges, rain forests, deserts).

Measuring can take place at one altitude (airborne platform) or synchronously at two altitudes (aircraft and airborne platform) within the PBL. Moreover, with an active airborne platform it is also possible to determine vertical measurement profiles at various flight altitudes to just above ground level during good conditions of visibility. However, during unfavourable conditions of visibility this is not possible with known active airborne platforms because possible contact of the airborne platform with the ground cannot be excluded. In towed airborne platforms the greatest problem and the most dangerous aspect always relate to the cable coupling between the aircraft and the airborne platform, in particular at very low flight altitudes, which can, however, anyway be reached only with active airborne platforms. The present invention relates to such active airborne platforms with their own manoeuvrability and to the safety aspects arising from their use, in particular during extreme low-level flying in regions with obstacles and under unfavourable conditions of visibility.

BACKGROUND

To provide an overview of the entire technical field, first of all, for example, US 2002/01900162 A1, U.S. Pat. No. 6,765,383 B1 and the publication "A new airborne tandem platform for collocated measurements of microphysical cloud and radiation properties" by W. Frey et al. (in Atmos. Meas. Tech., 2, 147-158, 2009) should be mentioned, which, however, exclusively deal with passive airborne platforms.

From JP 2000-292097 A a towed active airborne platform is known that is used as an aerial target for military training purposes. This airborne platform is cylindrical in design and comprises four axial air guide surfaces that are arranged in front of the middle region so as to be orthogonal relative to each other and that can be considered to be aerofoils, and four axial air guide surfaces in the rear region that are also arranged so as to be orthogonal relative to each other and that are used for flight stabilisation. Only the aerofoils are rotatably arranged on radial axes; they are used for manoeuvring the airborne platform. A similar airborne platform is known from U.S. Pat. No. 4,014,481 A. However, in this design the aerofoils are not rotatably arranged on axes, but instead comprise integrated spoilers that are comparable to control flaps, and by way of torsion bars can be deflected in that electromagnets are excited. If the electromagnets are not excited, said spoilers return to the initial position. However, as a result of cable attachment on the nose of the airborne platform, only extremely limited manoeuvrability of the airborne platform is provided. The spoilers are intended to generate fast, almost jerky, movements of the airborne platform in order to simulate a difficult aerial target. From US 2013/0062464 A1 a towed airborne platform is known which is manoeuvrable by means of various control surface devices. In this arrangement the airborne platform comprises several aerofoils that are arranged in a cruciform shape, box shape or lamellae shape. In this manner stable manoeuvrability is to be achieved. However, such manoeuvrability is again greatly restricted in that the airborne platform is towed and in that the cable is latched to the nose.

The state of the art closest to an embodiment of the invention is known from the presentation "Measurements of Air-Sea Fluxes with a Controlled Towed Vehicle (CTV)" by D. Khelif et al. This presentation was published in the context of the 2010 Ocean Sciences Meetings of the UNOLS Scientific Committee for Oceanographic Aircraft Research in the Town Hall Session in Portland, Oreg., USA, on Feb. 2, 2010; it can be downloaded from the internet (status Nov. 21, 2013) under URL <<http://www.unols.org/meetings/2010/201002sco/201002scoap_09.pdf.>>.

The known CTV is a cylindrical airborne platform (approx. 2.2 m in length, 25 cm in diameter, weighing 40 kg) for the non-contacting determination of measurement data from the airspace. To this effect a carrying cable is latched to the middle region of the airborne platform, and the airborne platform is towed through the air by an aircraft, with the latter being a powered air vehicle. The known airborne platform comprises various sensors for determining the measurement data, for example meteorological sensors (pressure sensor and temperature sensor, hygrometer and anemometer as well as trace gas sensor systems) and for determining the position of the airborne platform in the air, for example radar-supported altimeter, GPS system, navigation system and video camera. No forward-looking sensors for position determination of the airborne platform are provided. In order to supply electrical power to all the on-board electrical components the known airborne platform comprises rechargeable batteries. In the middle region of the airborne platform two short stub-wings or aerofoils are arranged that are rotatable on a radial axis by way of an electrical adjusting device. By way of rotation of the aerofoils a change in altitude of the airborne platform can be effected. If the carrying cable is fully extended, the airborne platform flies in equilibrium at a particular distance from the aircraft, wherein the carrying cable is curved as a result of aerodynamic drag. If in this initial position the aerofoils are rotated, as a result of downthrust the airborne platform can descend still further (while tightening the carrying cable). Thus the flight altitude of the airborne platform can be still further reduced. At a minimum the airborne platform can fly at 10 m above the open ocean, a region without natural obstacles. In the lowered state the airborne platform can climb again in that the aerofoils are rotated in the opposite direction. For constructive flight stabilisation the known airborne platform further comprises several air guide surfaces in its rear region radially arranged on its longitudinal axis, wherein two first air guide surfaces are arranged so as to be parallel to the aerofoils. These air guide surfaces are arranged rigidly and in a non-adjustable manner on the airborne platform. They are not used for changing the flight position. Thus, the CTV is not independently controllable laterally. Furthermore, the known airborne platform comprises a computer-supported control device that has an automatic flight management system for controlling the flight position (flight altitude) of the airborne platform in a self-acting manner. By changing exclusively the flight altitude it is possible to fly over obstacles in a controlled manner, wherein such control is, however, carried out by the operator on board the towing aircraft. If flying over an obstacle is not possible or no longer possible, for the purpose of jettisoning the airborne platform, predetermined braking points are provided in the carrying cable, as are manually-operable cutting devices in the winch region of the aircraft. The flight management system further comprises a malfunction module, which is activated in the case of a malfunction, by means of which malfunction module the adjusting devices of the aerofoils are reset to their initial position so that the airborne platform moves back to its higher flight position in equilibrium. No statement relating to the type of malfunction or the design of the malfunction module is made. It must be assumed that in the case of an emergency the airborne platform is jettisoned, which can result in great danger and in great expenditure.

A further presentation relating to this known airborne platform (CTV), entitled "Measurement at the Air Sea Interface with the Controlled Towed Vehicle" was given by G. Kok, President of Droplet Measurement Technologies (DMT) before the American Meteorological Society at the 20th Symposium on Boundary Layers and Turbulence, or on the $18^{th}$ Conference on Air-Sea Interaction on Monday 9 Jul. 2012 in Westin Copley Place, Boston, Mass., USA, published under the following URL (downloadable from the internet, status Nov. 11, 2013) <<https://ams.confex.com/ams/20BLT18AirSea/webprogram/Paper209425.html.>>. However, the disclosure content of this publication does not go beyond that of the first-mentioned publication. The same applies to a flyer 11/12/11 Rev A issued by Droplet Measurement Technologies (DMT) relating to the CTV, which flyer was handed out to the inventors by G. Kok on the occasion of a conference by the American Geophysical Union AGU in San Francisco, USA, 5-9 Dec. 2011.

A malfunction system for the control system of an aircraft is, for example, known from EP 1 422 680 B1. In this arrangement, in the case of an emergency, the central control of selected systems can be overruled and the aircraft can be moved to a final approach alignment. Moreover, generally-speaking, from EP 2 617 647 A2 an actuator system for use with actuators, for example in aviation, is known, which actuator system in the case of an emergency in the deactivated state assumes a defined state and locks it there so that this state is maintained even in the case of unintended or incorrect control. The system is reversibly switchable, by way of various kinematic elements, between the locked position (first dead-centre position) and an unlocked position (second dead-centre position), wherein it can, however, also be moved beyond the dead-centre positions. Consequently no reliable locking is ensured. Finally, from U.S. Pat. No. 6,111,327 A a malfunction module is known which in the case of an impact switches off the electrical power to a vehicle. To this effect said module comprises a spring-loaded blade lever that toggles a switch.

SUMMARY

In an embodiment, the present invention provides a cylindrical active airborne platform for determining measurement data including a middle region that is latchable to a carrying cable such that the airborne platform is towable through the air by a powered aircraft. Sensors are configured to determine the measurement data and a flight position of the airborne platform. Two aerofoils are arranged in the middle region of the airborne platform, which are adjustable and are connected to electrical adjusting devices so as to vary a vertical flight position of the airborne platform. The electrical adjusting devices are configured as ailerons. A plurality of air guide surfaces are arranged at a rear region of the airborne platform radially from a longitudinal axis of the airborne platform. Opposing two first air guide surfaces and two second air guide surfaces of the plurality of air guide surfaces have further electrical adjusting devices, one of the further electrical adjusting devices for the two first air guide surfaces being configured as elevators and another of the further electrical adjusting devices for the two second air guide surfaces being configured as rudders. A computer-supported control device comprises an automatic flight management system that is configured to provide self-acting control of the vertical flight position of the airborne platform, and that is configured to control the further electrical adjusting devices. The flight management system includes: a malfunction module by which the ailerons, elevators and rudders are movable to respective non-deflected initial positions where the ailerons, elevators and rudders are locked, the malfunction module having an electromechanical malfunction system configured to be automatically activated in a state of failure of an electric power supply thereof; an evasion module by which the ailerons, elevators and rudders are automatically adjustable in such a manner that the airborne platform being towed avoids any obstacles determined by the sensors at a predetermined measurement frequency by optimally changing the flight position; and a stabilisation module by which the ailerons, elevators and rudders are automatically adjustable in such a manner that the flight position of the airborne platform being towed is stabilised, wherein during retrieval of the airborne platform underneath the aircraft, a measurement frequency of the sensors is increased depending on a distance between the airborne platform and the aircraft. Rechargeable batteries are configured to supply electric power.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Starting from the previously described CTVs, an embodiment of the present invention improves the above-described generic airborne platform in such a manner that it is fully manoeuvrable in all the spatial axes and is able autonomously, in other words without any influence from the towing aircraft or its crew or other operators outside the aircraft, to fly around obstacles using the shortest route, wherein in a power failure as a possible malfunction the resetting of all the control surfaces to the initial positions is safely ensured.

According to an embodiment of the invention, the airborne platform includes an electrical adjusting device of the aerofoils that is designed as an aileron. This results in improved manoeuvrability of the airborne platform in terms of flight altitude when compared to the aerofoils in known CTVs, which aerofoils are only rotatable. However, in the airborne platform according to an embodiment of the invention, air guide surfaces are also designed so as to be adjustable; they comprise electrical adjusting devices that are also controlled by the automatic flight management system. In this arrangement the adjusting device of the two first air guide surfaces is designed as an elevator, and the adjusting device of the two second air guide surfaces is designed as a rudder so that the airborne platform according to an embodiment of the invention together with the aileron provides complete manoeuvrability in all three spatial axes. Controlled optimal evasion of obstacles by combined changes to the vertical and the lateral flight positions is safely ensured. Furthermore, in the airborne platform according to an embodiment of the invention this optimum evasion characteristic, which above all makes it possible to fly at very low altitude in the region of obstacles (5-10 m above the surface), is automated so that the airborne platform carries out all the manoeuvring movements completely independently and autarchically, rather than being controlled from the outside. To this effect the automatic flight management system comprises an evasion module by means of which ailerons, elevators and rudders are automatically adjusted in such a manner that the towed airborne platform autonomously evades any obstacles, which have been detected by the sensors, by optimally changing its flight position.

Furthermore, according to an embodiment of the invention, the automatic flight management system of the airborne platform comprises a stabilisation module by means of which ailerons, elevators and rudders are automatically adjusted in such a manner that the flight position of the towed airborne platform is stabilised, wherein during retrieval of the airborne platform underneath the aircraft, depending on the distance between the airborne platform and the aircraft, the measurement frequency of the sensors is increased. Pendulum movements are compensated for by the stabilisation module. The airborne platform remains in a stable flight position and does not roll. Complete retrieval of the airborne platform to the aircraft during flight in preparation for the landing of the aircraft poses a very considerable safety risk. Airflows and turbulence underneath the aircraft can result in pendulum movements of the airborne platform, as a result of which movements the aircraft can be damaged. Furthermore, because of conservation of momentum, pendulum movement increases as the length of the carrying cable decreases. This becomes particularly critical from a distance of approximately 5 m from the aircraft. In order to be able to compensate for increasing pendulum movements from the very beginning, preferably and advantageously from this distance onwards the measurement frequency can be increased, in particular to 5 Hz. Outside the distance of increased measurement frequency, as a rule the normal measurement frequency is 1 Hz, in other words one measurement per second.

In the airborne platform according to an embodiment of the invention, automated independent flying around detected obstacles already represents a relevant safety aspect that considerably relieves the workload of the pilot of the aircraft. In practical application, so far no towed airborne platform has been in existence that can fully manoeuvre in all three spatial directions. In this respect, pilots are always under pressure to react in hazardous situations, be it by changing the flight altitude of the aircraft or the length of the carrying cable or even by jettisoning the airborne platform. To further improve safety, the airborne platform according to an embodiment of the invention includes a malfunction module comprising an electromechanical malfunction system which in the case of failure of its electric power supply is automatically activated, and by means of which malfunction system the ailerons, elevators and rudders are moved to their non-deflected initial positions where they are locked. In this arrangement, an embodiment of the invention preferably and advantageously provides that failure of the electrical power supply of the electromechanical malfunction system is caused by depleted rechargeable batteries as a possible malfunction or by the response of a fault detector in other malfunctions or by manual intervention. In particular the failure of the entire power supply during supply from rechargeable batteries is a frequently occurring malfunction in a towed airborne platform, in particular in the case of very long measurement flights (flying time>5 h). If this malfunction occurs with the control surfaces deflected, retrieval of the airborne platform into the aircraft is rendered extremely difficult or impossible. The airborne platform according to an embodiment of the invention thus ensures that in the case of a power failure all control surfaces return to their neutral positions. For this purpose a malfunction module operating on an electromechanical basis is used, which module in the case of a power failure operates safely in a purely mechanical manner, thus ensuring the return of the control surfaces to their non-deflected initial positions. However, other malfunctions that occur can also result in triggering the malfunction system if they are detected by a fault detector and if they are converted to the discontinuation of the electrical power supply of the malfunction system. This can, for example, relate to the failure of measuring equipment or navigation equipment or to damage to the airborne platform or to the control surfaces or to other navigation-relevant components. Lastly, the malfunction system can also be triggered manually by the pilot of the aircraft when said pilot wishes to retrieve the airborne platform to the aircraft.

In the airborne platform the malfunction system for the resetting of control surface deflections comes into force in the case of failure of its electrical power supply as a result of a malfunction that has occurred. It must thus be ensured that the malfunction system operates without a power supply. For this purpose, according to an embodiment of the invention, the malfunction system is of an electromechanical design. As long as an electrical current flows the malfunction system is in standby mode and all control surfaces can be deflected by the automatic flight management system (autopilot). Any loss of power activates and triggers the malfunction system. To this effect, according to a further embodiment of the invention, the airborne platform is advantageously and preferably characterised in that the malfunction system comprises an electromagnetic coil that in the current-carrying state holds a spring-loaded ratchet lever, and in the non-current-carrying state releases said ratchet lever, as a result of which a spring-loaded angle lever moves from a first position (A) to a second position (B) and by way of a first control axis, guided in a sliding block guide, which control axis is also moved to a second position (B) by means of the angle lever, moves a lever arm, and a second control axis moves the ailerons, elevators and rudders to the non-deflected initial position where it locks them. In this arrangement it is preferable and advantageous if the malfunction system during activation automatically displays a clearly visible signal flag. Explanation of the functional principle of the malfunction system in the airborne platform according to an embodiment of the invention is considerably simplified with the aid of illustrations. In this context reference is thus made to the special descriptive part containing the corresponding exemplary embodiments.

The automatic flight management system as part of the computer-supported control device in the airborne platform according to an embodiment of the invention comprises the following components:

three control surfaces for all three spatial axes (elevators, rudders, ailerons), which by means of electrical adjusting devices, for example stepper-type servo motors, can be adjusted in terms of their deflection, a CPU with software for implementing the various control algorithms with digital filters, data converters and storage media, an altimeter, depending on which the flight altitude of the airborne platform is automatically kept stable, an automatic stabilisation module that keeps the flight and in particular retrieval of the airborne platform stable in the face of pendulum movements and rocking movements and also accepts external commands; it is supplemented by a GPS module with an inertial measuring unit with a gyrometer and an acceleration sensor, an automatic evasion module for flying around obstacles, and a malfunction module comprising an electromechanical malfunction system that resets the control surfaces to their non-deflected initial positions if a malfunction occurs.

With these components the automatic flight management system in the airborne platform according to an embodiment of the invention implements five different operating modes:

operating mode "off, normal": the flight management system is currentless, and the malfunction system is also not activated operating mode "active, normal": the flight management system operates with the power supply active, under the control of the pilot and the automatic system. The latter automatically monitors and controls the flight position of the airborne platform. Within certain limits relating to the aircraft, the carrying cable and the ground, the airborne platform is automatically manoeuvred in all three spatial axes operating mode "active, evade": the evasion module is activated. In the case of an impending collision, acquired by the sensors, with an obstacle of any kind, control commands are issued, by the evasion module, to the three control surface devices of the airborne platform, which control commands result in optimum evasion in the possible three spatial axes so as to prevent any collision. If the airborne platform if flying below a predetermined altitude value, for example 20 m, a warning is issued to the system operator, who then has to decide accordingly. If the airborne platform descends to below the minimum altitude value of 10 m, a control command for the airborne platform to climb is immediately issued operating mode "active, retrieve": the stabilisation module is activated. During retrieval of the airborne platform to the aircraft the automatic flight management system operates at a higher frequency in order to be able to quickly compensate for pendulum movements of the airborne platform by means of counteraction of the control surfaces operating mode "active, malfunction": the malfunction system is triggered as a result of the failure or loss of its power supply. All the control surfaces are mechanically reset to their neutral initial positions where they are locked; the airborne platform can be retrieved without any danger. Return to a normal operating mode is not possible; before this can occur the control surfaces must first be manually unlocked.

With the airborne platform according to an embodiment of the invention automatic control of the flight position takes place, and consequently precise positioning of the airborne platform relative to the ground becomes possible. Said airborne platform can, in particular, be used at flight altitudes with special wind regimes, with low cloud and in complex terrain in which otherwise stringent restrictions apply ("restricted category") or in which operation of an airborne platform has hitherto not been possible at all. Precise positioning is of particular importance for measurement flights. In this context the airborne platform represents a complex measurement system. Said airborne platform comprises sensors for determining measurement data for scientific purposes and measurement data for its own navigation. Preferably and advantageously in an embodiment of the invention, it is provided that the sensors comprise at least one forward-looking infrared camera system, a video camera system, a laser-supported distance measurement system, a radar-supported altitude measurement system, a satellite-supported positioning system and/or a meteorological measurement system. These systems are in principle known from the state of the art; they ensure reliable position determination of the airborne platform in all weather conditions. Advantageously and preferably at least the sensors for the acquisition of the flight position, for example the infrared camera (FLIR—Forward Looking InfraRed), the video cameras and the sensors for determining the meteorological state (AIMMS 20 Aircraft Integrated Meteorological Measurement System by Aventech, also comprises a GPS and further components) can be arranged on the outer ends of the aerofoils. Consequently these sensors can be forward-looking in an optimal manner and can operate optimally. A pivotable video camera in the aircraft represents a further safety aspect. Said video camera can, in particular, monitor the airborne platform and can present it on a display that can easily be viewed by the pilot in the aircraft. By means of observation any activation of the malfunction system (indicated by an extended signal flag) can immediately be detected, and uncontrolled ground contact can be avoided.

For the purpose of accommodating the sensors for scientific data acquisition, preferably and advantageously in the airborne platform according to an embodiment of the invention in the nose region of the airborne platform a compact measuring module can be provided that contains at least part of the scientific sensors for measurement data acquisition (in addition also at least in part the sensors for flight data determination) and that is easy to exchange. In this arrangement the module can, for example, simply be screwed into place by way of a thread. As a result of the arrangement at the nose cone of the airborne platform it is thus also possible to provide forward-looking measurement sensors. The measuring module can be designed so as to have a customer-specific payload and can correspondingly be easily exchanged for other measuring modules, depending on customer requirements also for commercial applications. Further sensors can also be arranged directly on or in the airborne platform. Aft of the aerofoils the airborne platform can receive the rechargeable batteries, the automatic flight management system and the malfunction module. Forward of the aerofoils further electronics equipment can be provided. Such equipment can, in particular, be used for electrical and data-specific connection of the measuring module. The data captured can preferably and advantageously be transmitted to the aircraft by way of W-LAN (bi-directional wireless data transmission device). Wireless data transmission can, for example, take place to a storage device in the airborne platform, to the aircraft, to a satellite station or to a ground-supported receiving station on land or on water. Data transmission takes place in both directions (bi-directional).

The particular manoeuvrability of the airborne platform according to an embodiment of the invention results from the provision of elevators, ailerons and rudders in conjunction with further components and automatic control. The control surfaces in the aerofoils are designed as ailerons, the control surfaces in the air guide surfaces are designed as elevators and rudders. In this arrangement the air guide surfaces can have various alignments relative to each other. From the state of the art, for example, oblique, cruciform or box-shaped arrangements of control surfaces are known. Such arrangements of the control surfaces at various angles relative to each other can be taken into account in the automatic control and can be compensated for. Each rudder or aileron then contributes to control in one spatial direction. However, in terms of control, the classic orthogonal alignment of the individual rudders and ailerons relative to each other, in which alignment each rudder or control surface is associated with a spatial direction, is easier. Therefore it is advantageous and preferable if the two first air guide surfaces (with the elevators) are arranged so as to be parallel, and if the two second air guide surfaces (with the rudders) are arranged so as to be orthogonal, to the aerofoils (with the ailerons). However, in the airborne platform according to an embodiment of the invention it is of course also possible to provide rigid air guide surfaces without control surface devices; said air guide surfaces are used for stabilising the airborne platform.

The stable position of the airborne platform is decisive in terms of the quality of the measurements and in terms of the safety both of the airborne platform and of the towing aircraft (i.e. the towed and the towing vehicle). Apart from electronic balancing of the airborne platform by means of the stabilisation module, a simple design measure can also contribute to the special stabilisation of the airborne platform. In the airborne platform according to an embodiment of the invention, it is thus preferably and advantageously provided that on the two first air guide surfaces fixed angled rear fins are arranged that are inclined between 4° and 6°, in particular by 5°, relative to the longitudinal axis of the airborne platform in the direction of its nose region. This is a known and very effective measure in the case of helicopters. Furthermore, preferably and advantageously directly on the airborne platform and/or on the rear fins, landing flaps can be arranged that are also controlled by the automatic flight management system. These miniaturised landing flaps (also referred to as "air brakes") in their extended state increase the aerodynamic resistance or drag of the airborne platform, thus contributing to its stabilisation and thus to the further safety of the overall system. This is, in particular, advantageous during the process of retrieving the airborne platform. A fixed, truncated-cone-shaped, rear-mounted structure in the rear region of the airborne platform also ensures further stabilisation because of a favourable aerodynamic shape of the airborne platform. In this arrangement it can preferably and advantageously be provided that in the rear region of the airborne platform a flow-driven generator (turbine) for charging the rechargeable batteries is arranged. This is a measure that to the greatest extent possible prevents the possible malfunction of "power failure as a result of depleted rechargeable batteries". To ensure that no interference to measurements occurs, it can be provided that the generator is in operation only if no measurements are carried out. In the middle of the generator the truncated-cone-shaped rear-mounted structure can be arranged. Further design details relating to the airborne platform according to the invention are provided in the exemplary embodiments described below.

A detailed image of the known CTV-airborne platform as the nearest state of the art to the airborne platform according to an embodiment of the invention can be obtained under the above-mentioned URL, wherein, in particular, photos of an overall view, of a lateral view, and of the internal instrument layout are shown.

Figure 1:
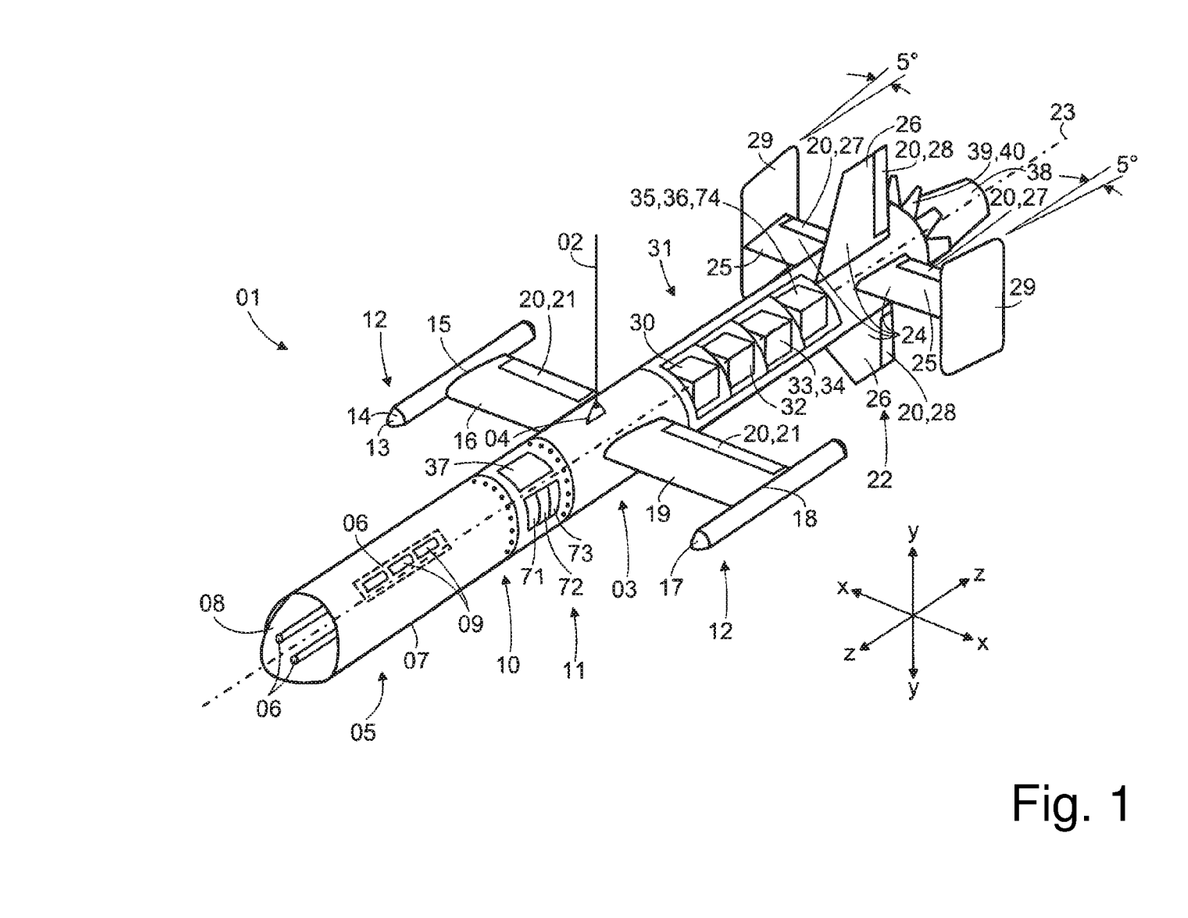
FIG. 1 a diagrammatic overall view of the airborne platform.

In relation to an embodiment of the invention, FIG. 1 shows an airborne platform 01 for determining measurement data. This is an active airborne platform 01. In this document, the term "active" refers neither to the airborne platform's own propulsion device nor to the type of measured-value acquisition, but instead to its independent manoeuvrability when being towed by an aircraft. The airborne platform 01 is connected to the aircraft by means of a carrying cable 02 (optimum range between 600 and 700 m) that in a middle region 03 of the airborne platform 01 is latched to an eye arrangement 04. As a result of being latched to the middle, the nose region 05 of the airborne platform remains free and thus manoeuvrable while the airborne platform 01 is towed through the air by the aircraft by means of the carrying cable 02. The airborne platform 01 can, for example, be 3.5 m in length, 0.35 m in diameter, and can have a weight of 150 kg.

The airborne platform 01 comprises sensors 06 for determining measurement data. In the exemplary embodiment shown, said sensors 06 are located predominantly in a compact measuring module 07 that is arranged in the nose region 05 of the airborne platform 01. The measuring module 07 has a customer-specific payload. It comprises a glass dome 08 behind which the forward-looking sensors 06 are arranged. Further sensors 06 are located behind openings 09 in the measuring module 07. In its rear region the measuring module 07 comprises a mounting region 10 that serves as a mechanical and electrical connection to the airborne platform 01. Behind the measuring module 07 there is an electronics section 11 in which the electronics to the power supply and the measurement data line of the measuring module 07 are arranged. Furthermore, in the electronics region 11 (but also in other locations on the airborne platform 01) a laser-supported distance measurement system 71, a radar-supported altitude measurement system 72 and a satellite-supported positioning system 73 can be accommodated.

The airborne platform 01 further comprises sensors 12 for determining the flight position of the airborne platform 01. In the exemplary embodiment shown, these are a forward-looking infrared camera 13 and a video camera 14, both arranged at the outer end 15 of an aerofoil 16, and a meteorological measurement system 17 arranged at the outer end 18 of the other aerofoil 19.

In the middle region 03 the airborne platform 01 comprises two aerofoils 16, 19 which, in order to vary the vertical flight position of the airborne platform 01, are designed to be adjustable and are connected to electrical adjusting devices 20. These are designed as ailerons 2. Furthermore, in its rear region 22 the airborne platform 01 comprises several air guide surfaces 24, arranged radially on its longitudinal axis 23. In this arrangement in the selected exemplary embodiment two first air guide surfaces 25 are arranged so as to be parallel, and two further air guide surfaces 26 are arranged so as to be orthogonal to the aerofoils 16, 19. However, the precise position of the air guide surfaces 25, 26 has not been determined in a mandatory manner; it can also comprise angles other than a right angle. All the first and second air guide surfaces 25, 26 also comprise electrical adjusting devices 20. In this arrangement the electrical adjusting devices 20 of the two first air guide surfaces 25 are designed as elevators 27, and the electrical adjusting devices 20 of the two second air guide surfaces 26 are designed as rudders 28. Furthermore, the first air guide surfaces 25 comprise fixed rear fins 29 that are inclined by 5° relative to the longitudinal axis 23 of the airborne platform 01 in the direction of its nose region 05, which fins 29 are used to aerodynamically stabilise the airborne platform 01.

Behind its middle region 03, in the airborne platform 01, rechargeable batteries 30 are arranged (shown in a section view, these components are, of course, situated in the interior of the airborne platform 01) to provide an electrical power supply, and a computer-supported control device 31. The latter comprises an automatic flight management system 32 that is used for the self-acting control of the flight position of the airborne platform 01 in all three spatial directions x, y, z. In this arrangement the automatic flight management system 32 comprises a stabilisation module 33 by means of which the ailerons 21, the elevators 27 and the rudders 28 are automatically adjusted in such a manner that the towed airborne platform 01 maintains its stability during flight and during retrieval. Furthermore, the automatic flight management system 32 comprises an evasion module 34 by means of which the ailerons 21, the elevators 27 and the rudders 28 are automatically adjusted in such a manner that the towed airborne platform 01 avoids any obstacles determined by the sensors 12 by optimally changing its flight position in all three spatial directions. Furthermore, the automatic flight management system 32 comprises a malfunction module 35, activated when a malfunction has occurred, with an associated malfunction system 36 by means of which the ailerons 21, the elevators 27 and the rudders 28 are moved to their non-deflected initial positions where they are locked. Further details relating to the malfunction system 36 are shown in the figures below.

In FIG. 1, furthermore, a wireless data transmission device 37 is arranged in the electronics section 11. By way of said data transmission device 37, data that has been acquired (both measurement data and flight position data) can be transmitted to any recipients. Finally, in the rear region 22 a fixed, truncated-cone-shaped rear-mounted structure 38 is provided that is also used for stabilising the airborne platform 01. The rear-mounted structure 38 is located on a generator 39. The generator 39 is designed as a turbine 40 that is driven by the airflow during the flight and thus generates electric current. The latter is used for charging the rechargeable batteries 30 of the airborne platform 01 during flight in order to be able to prevent a possible malfunction "power failure as a result of discharged rechargeable batteries". Furthermore, the malfunction "power failure" can, for example, also be caused by a line interruption or a contact interruption. The malfunction "power failure" directly results in activation of the electromechanical malfunction system 36. Other malfunctions that may occur are detected by a fault detector 74 as a component of the malfunction module 35 and are converted to an interruption in the power supply of the malfunction system 36, which results in the latter's activation. A manually triggered activation is also possible.

Figure 2:
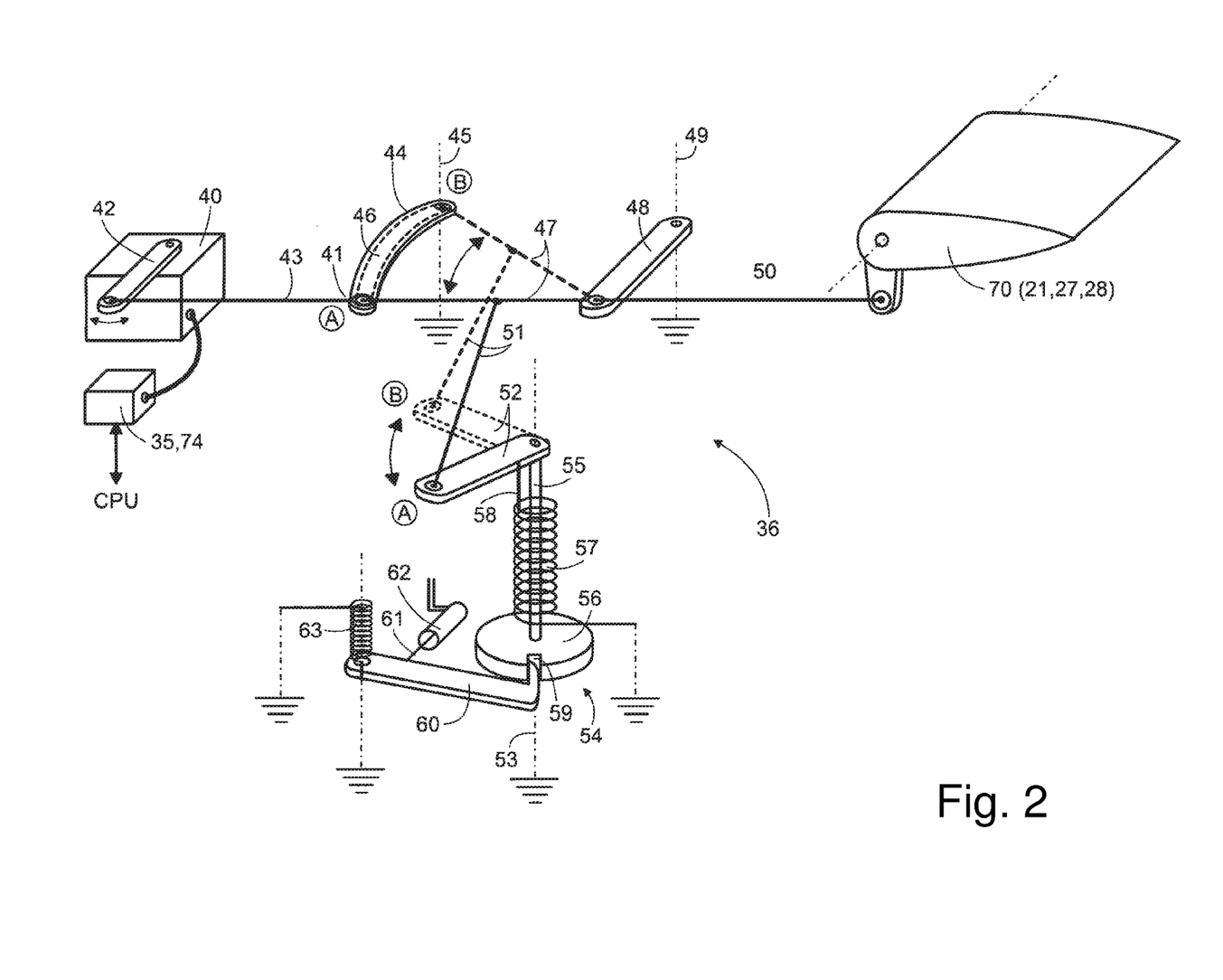
FIG. 2 a diagrammatic overall view of the malfunction system.

FIG. 2 diagrammatically shows components of the electromechanical malfunction system 36. In this arrangement only one control surface, namely an aileron 21, is shown. However, the malfunction system 36 of course also accesses all the ailerons 21, rudders 28 and elevators 27 in order to be able to reset them, in the case of a malfunction, to their non-deflected initial positions and to lock them in those positions so that the airborne platform 01 can be retrieved into the aircraft without there being any danger. The explanations below thus apply to any control surface 21, 27, 28. For the sake of simplification, all the control surfaces are designated by reference character 70.

The control surface 70 is associated with a servo motor 40 that is controlled by the malfunction module 35. The servo motor 40 operates a servo control rod 43 by way of a servo arm 42. The servo control rod 43 is firmly connected to one end 41 of a setting lever 44; it rotates said setting lever 44 as part of its stroke on a stationary ("ground symbol") first guide axis 45 that is firmly connected to the other end of the setting lever 44. In the sliding block guide 46 of the setting lever 44 a first control axis 47 is guided on one end. On its other end the first control axis 47 is connected to one end of a lever arm 48. The other end of said lever arm 48 is rotatably held on a stationary second guide axis 49. One end of the lever arm 48 is also engaged by a second control axis 50, which in turn is connected to the control surface 70, thus being able to pull said control surface to its non-deflected initial position.

The first control axis 47 is connected to one end of a spring-loaded angle lever 52 by way of an actuation axis 51. The other end of said angle lever 52 is rotatably held on a stationary third guide axis 53. Furthermore, at its other end the angle lever 52 is firmly connected to an interlocking system 54 that comprises a tube 55, which moves on the third guide axis 53, and an interlock disc 56. Above the interlocking system 54 a first spiral spring 57 (with a torsion effect) is arranged on the tube 55, which spiral spring 57 on the one hand is affixed so as to be stationary, and on the other hand with one end 58 presses against the angle lever 52. The interlock disc 56 comprises a recess 59 which is engaged by a ratchet lever 60. The latter is affixed by way of a plunger 61 of an electromagnetic coil 62. Furthermore, a stationary second spiral spring 63 engages the ratchet lever 60 and exerts a compression force onto said ratchet lever 60. During normal operation the two spiral springs 57, 63 are under tension, and the ratchet lever 60 is positionally-fixed in the recess 59 by way of the plunger 61 of the current-carrying electromagnetic coil 62. The first control axis 47, which is connected to the angle lever 52, is in a first position A ("control position").

Figure 3A:
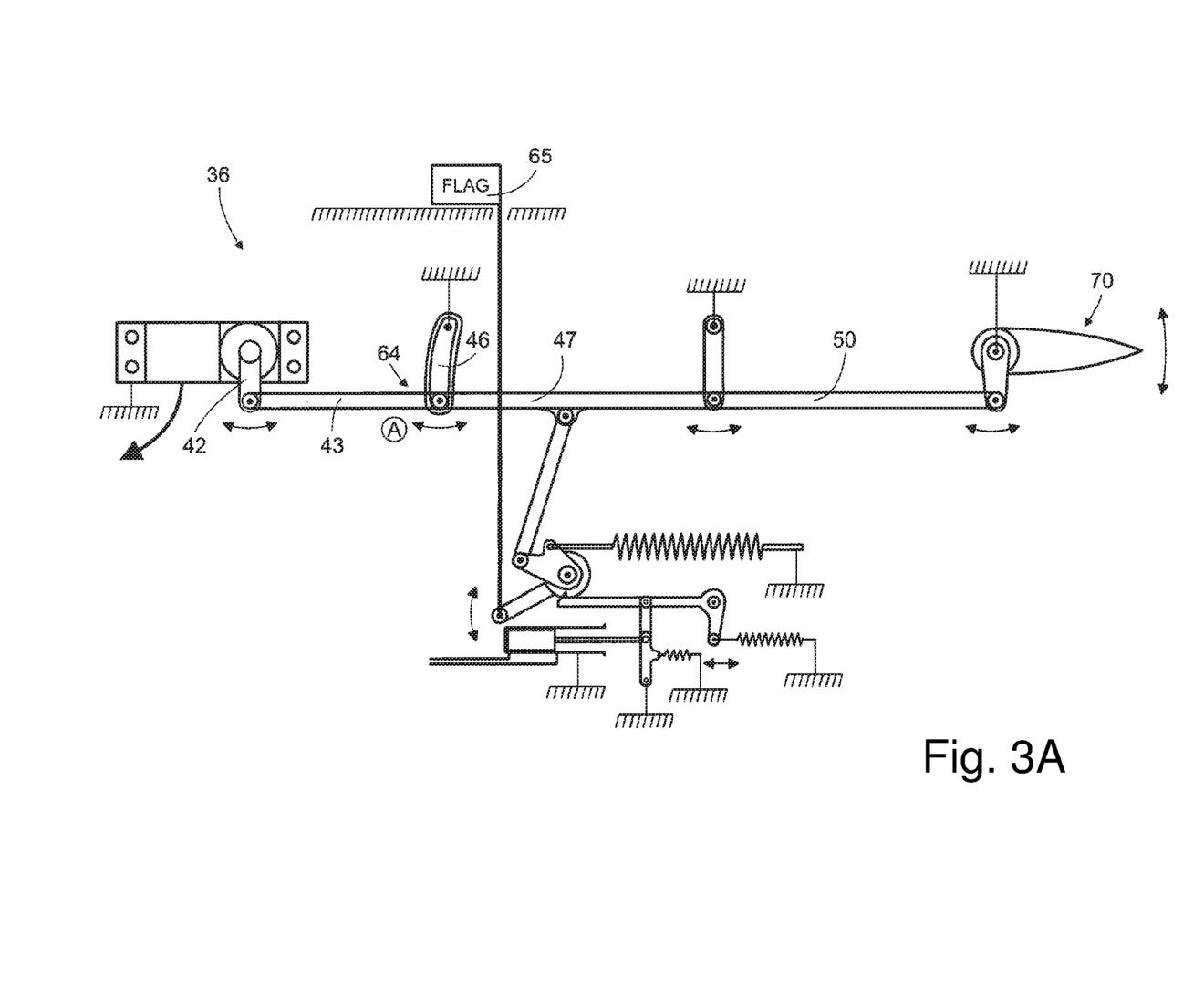
FIG. 3A a first detailed view of the malfunction system during normal operation (no control surface adjustment), FIG. 3B a second detailed view of the malfunction system during normal operation (control surface adjustment "up"), FIG. 3C a third detailed view of the malfunction system during normal operation (control surface adjustment "down"), FIG. 3D a first detailed view of the malfunction system during a malfunction (no control surface adjustment), FIG. 3E a second detailed view of the malfunction system during a malfunction (with control surface adjustment), and FIG. 4 possible locations for the installation of miniaturised landing flaps.

In FIG. 3A the functional diagram of the malfunction system 36 is shown in normal flight operation, wherein said malfunction system 36 is ready for operation (the springs are tensioned) but has not been triggered. The malfunction system 36 is in the state as described above. In a lower end position 64 (first position A, control position) the first control axis 47 engages the sliding block guide 46 and forms a line with the second control axis 50. By way of the servo control rod 43 and the two control axes 47, 50, movements of the servo arm 42 are directly transmitted to the control surface 70. However, the servo arm 42 is not deflected, and correspondingly the control surface 70 is in its non-deflected initial position. FIG. 3A further shows a signal flag 65 which indicates, in a manner visible to the pilot, whether or not the malfunction system 36 is activated. In the inactivated state the signal flag 65 is retracted.

Figure 3B:
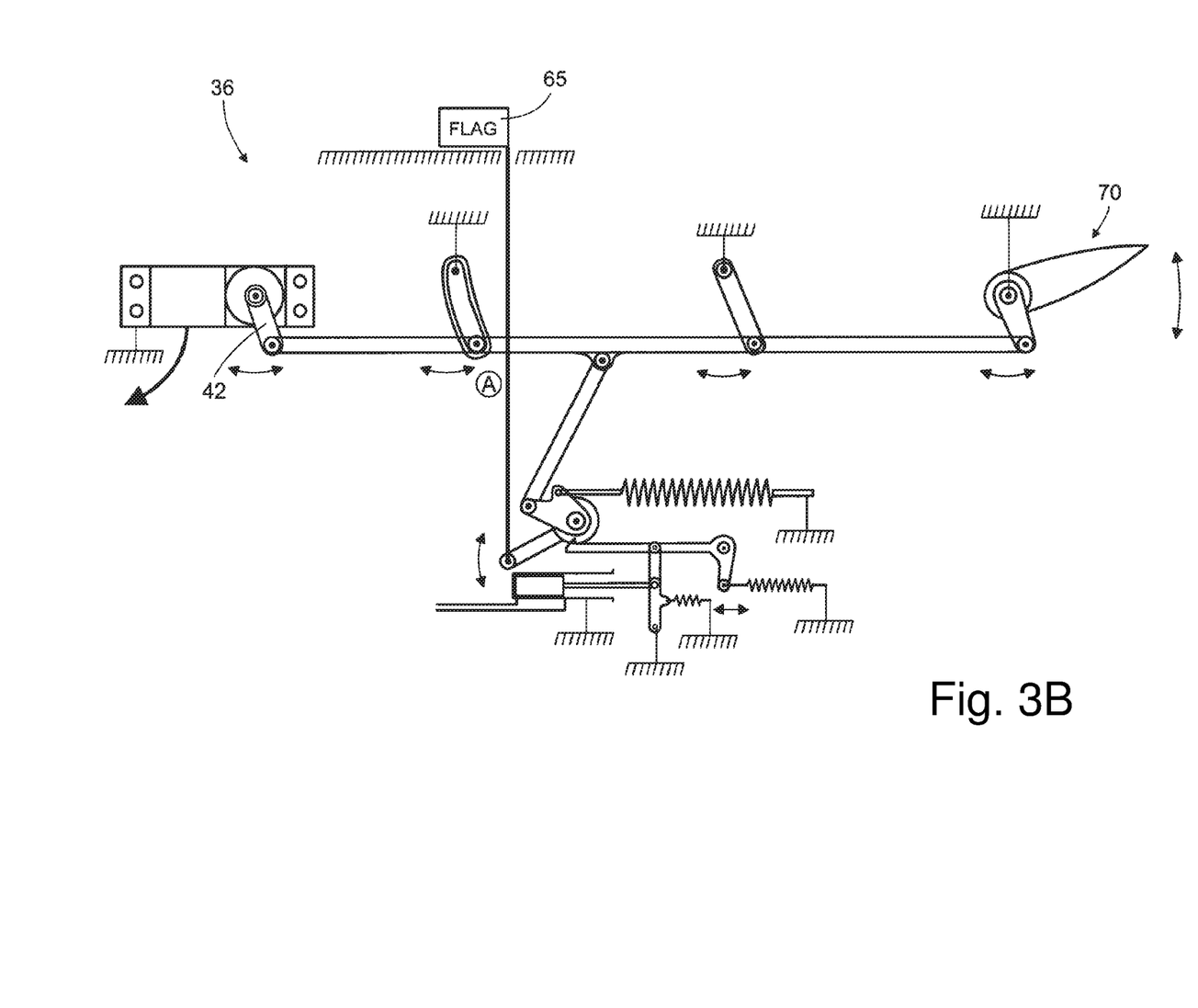
Figure 3C:
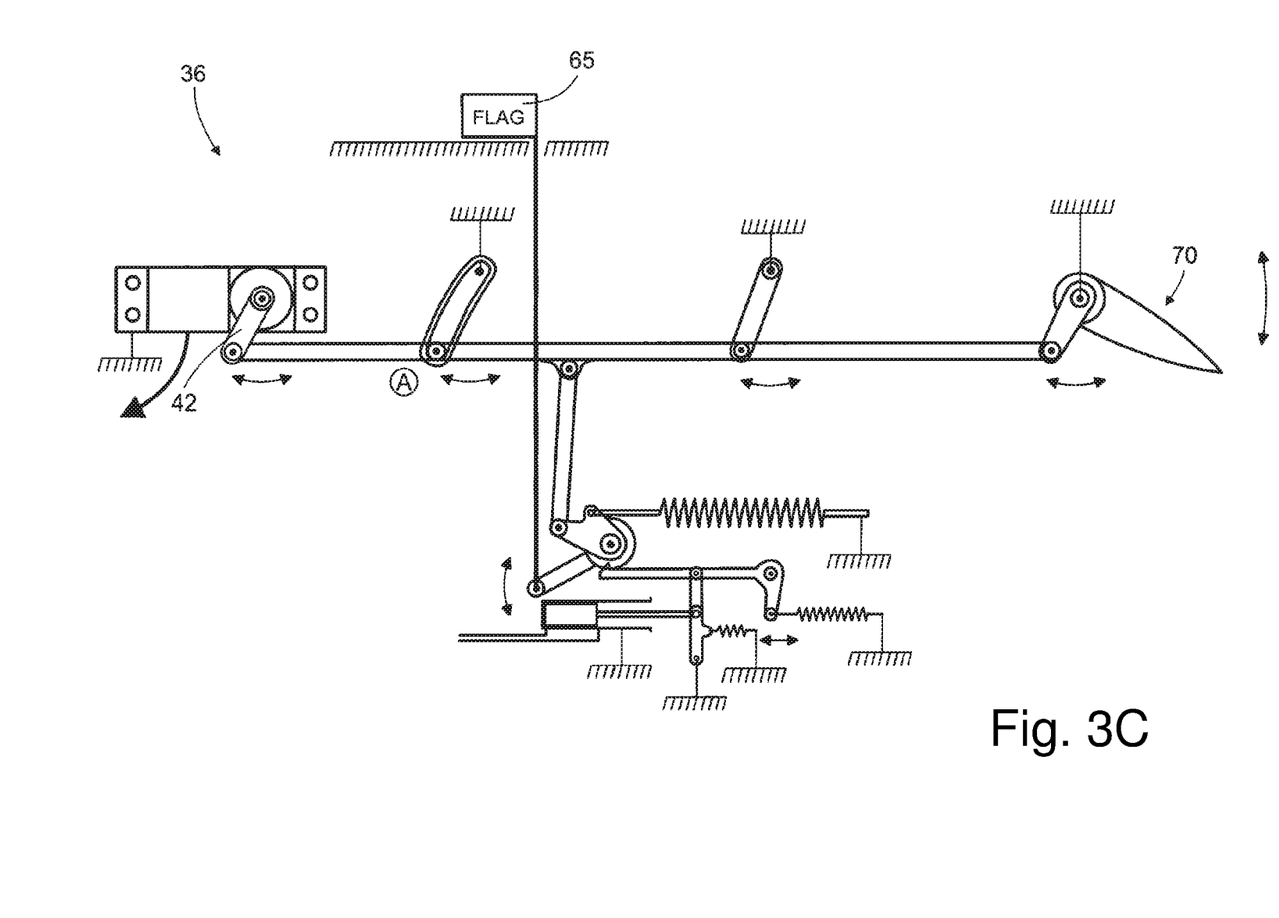

In FIG. 3B the servo arm 42 is deflected towards the right-hand side, and the control surface 70 is deflected upwards. In FIG. 3C the servo arm 42 is deflected towards the left-hand side, and the control surface 70 is deflected downwards. Normal flight operation prevails with full manoeuvrability in the three-dimensional space.

Figure 3D:
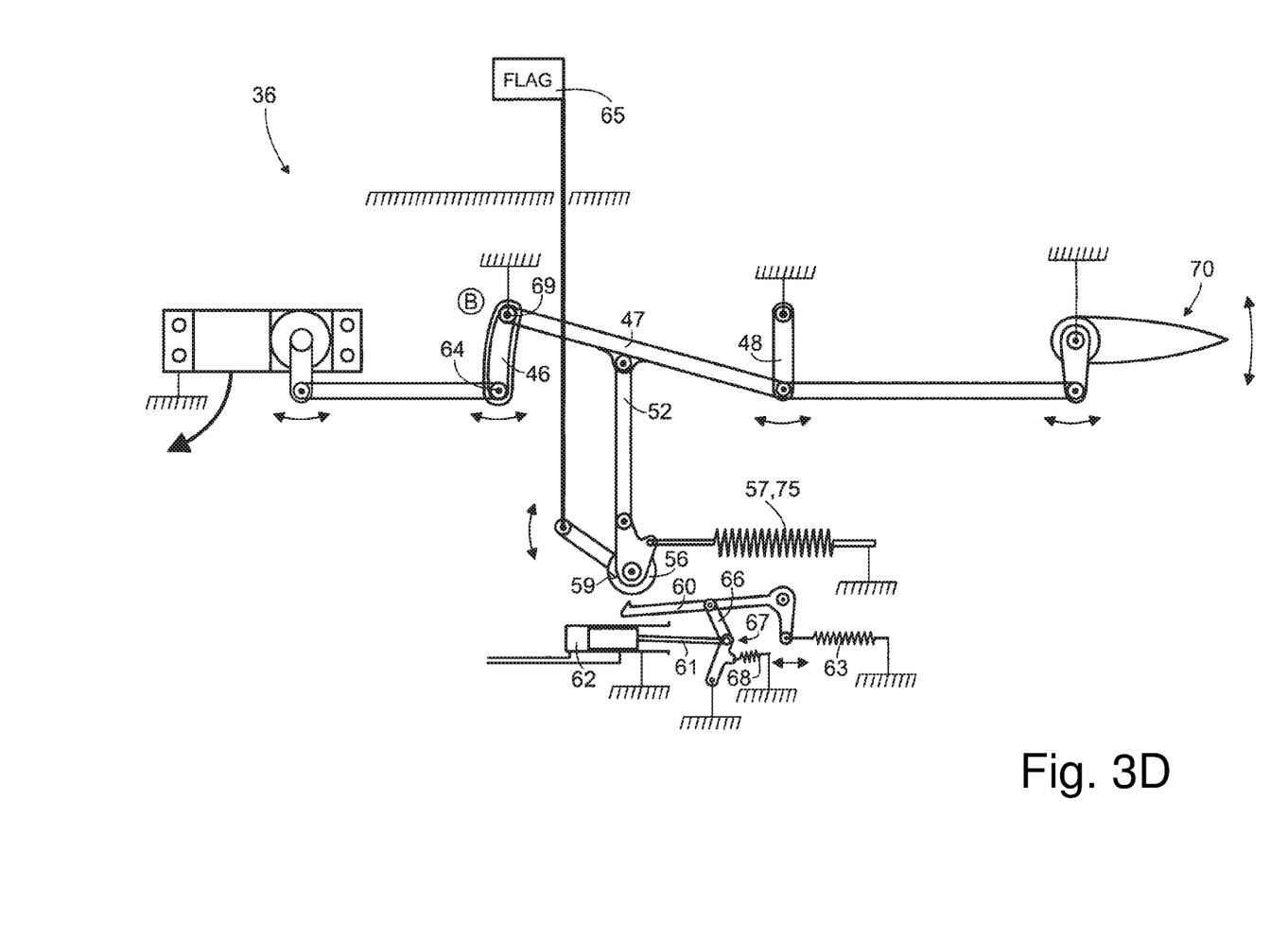

FIG. 3D shows the state after a malfunction has occurred. The malfunction system 36 is activated. The diagram shows that the plunger 61 of the presently currentless electromagnetic coil 62 is extended. Consequently, the ratchet lever 60 has been pulled, by means of the second spiral spring 63, from the recess 59 of the interlock disc 56. In the exemplary embodiment shown, the ratchet lever 60 is connected to an articulated lever 66. A third spiral spring 68 engages the joint 67 of said articulated lever 66, which spiral spring 68 deflects the articulated lever 66 so that the ratchet lever 60 is pulled downwards when the plunger 61 no longer exerts a holding force. As a result of release of the interlock disc 56 the angle lever 52 is pushed upwards by a tension spring 75. In this arrangement the tension spring 75 corresponds to the first spiral spring 57 (torsion) according to FIG. 1, except in some other installation position, and consequently it has a different effect. In this arrangement there is no tube 55. The first control axis 47 is moved from the lower end position 64 in the sliding block guide 46 (first position A, control position) to the upper end position 69 (second position B, locked position). The lever arm 48 is blocked in its initial position, as is the control surface 70. At the same time the signal flag 65 is extended so that the pilot of the aircraft is able to recognise that there has been a power failure in the airborne platform 01, that the latter is no longer manoeuvrable and needs to be retrieved.

Figure 3E:
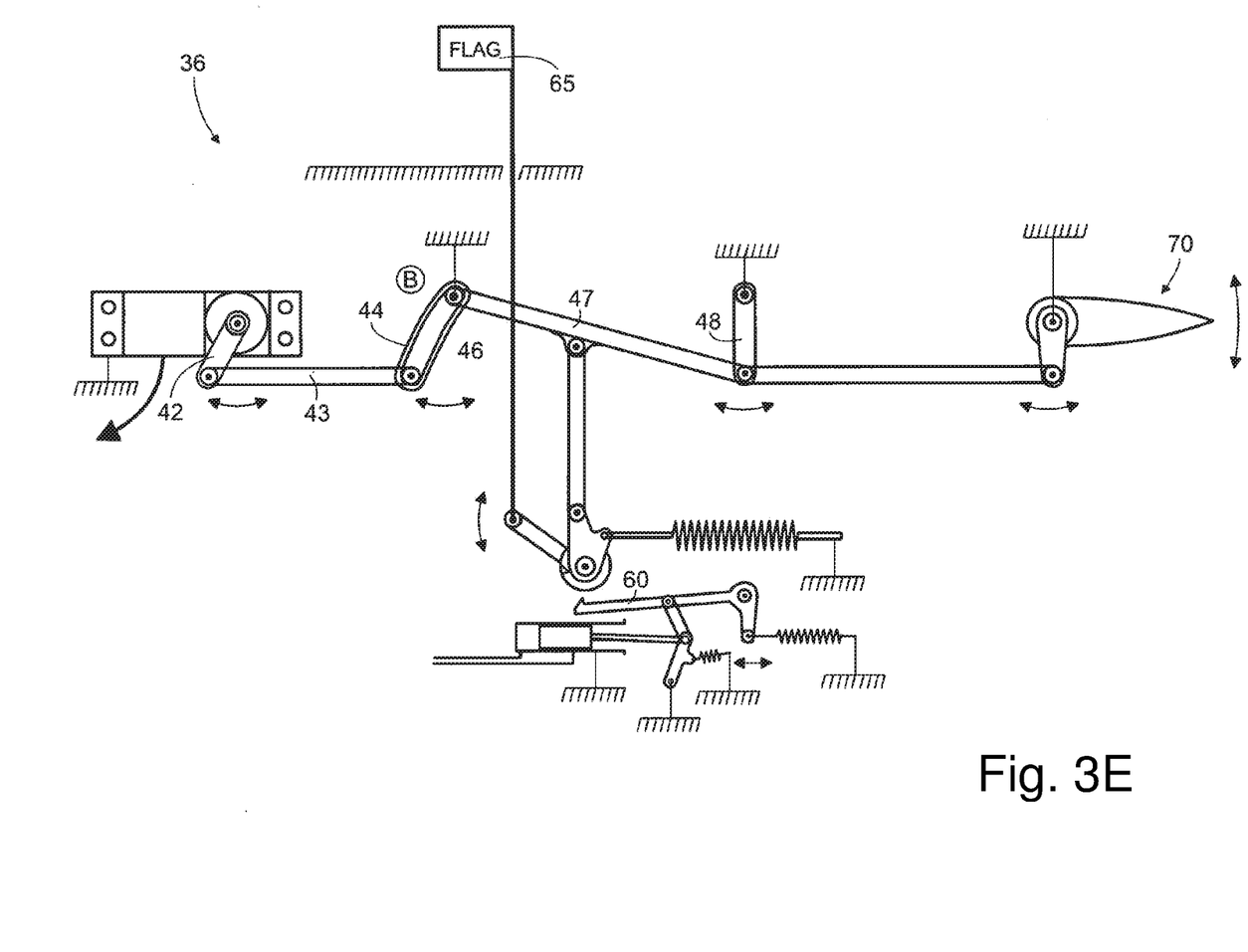

FIG. 3E shows that in position B, locked position, movements of the servo arm 42 and of the servo control rod 43 remain without any positional change of the first control axis 47 and of the lever arm 48 and result only in rotation of the setting lever 44. The control surface 70 remains blocked in its neutral initial position. Blocking can only be cancelled by manually resetting the first control axis 47 in the sliding block guide 46 in the setting lever 44. Likewise, the ratchet lever 60 needs to be manually latched in again. This can take place only as part of a service or maintenance procedure of the airborne platform 01 on the ground. However, in return, the malfunction system 36 always provides absolute reliability in the case of a malfunction, and consequently the airborne platform 01, in particular, cannot assume any dangerous flight positions, or is not used without generating measurement data. The airborne platform 01 can thus particularly advantageously be used for all kind of measurements in close proximity to the ground, where otherwise the most stringent safety requirements apply.

Figure 4:
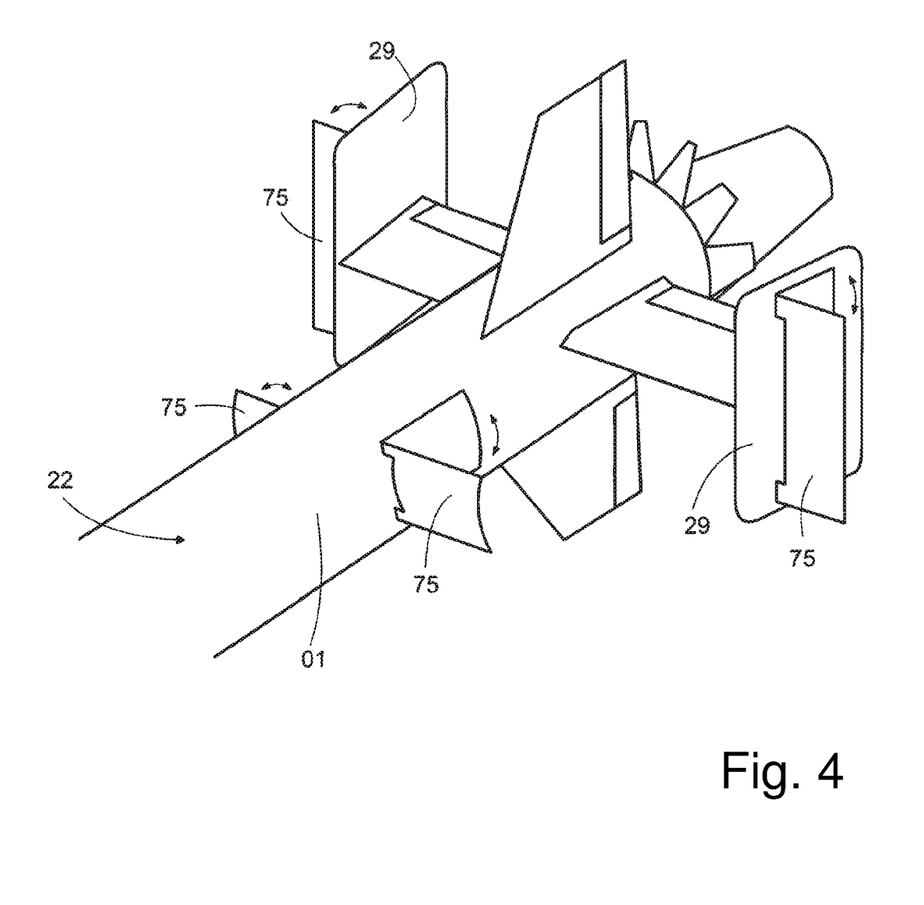

Finally, FIG. 4 shows possible locations for the installation of miniaturised landing flaps 76 that are used for stabilising the airborne platform 01. Said landing flaps 76 can be arranged directly on the airborne platform 01 in its rear region 22 or on the rear fins 29, provided the airborne platform 01 has rear fins 29. Arrangement in both locations or in yet other locations is also possible. The landing flaps 76 are also controlled by the automatic flight management system 32 and are, in particular, extended during the process of retrieving the airborne platform 01 to the aircraft. During flight operations the landing flaps 76 are retracted (double arrow).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

01 Airborne platform
02 Carrying cable
03 Middle region of 01
04 Eye arrangement
05 Nose region of 01
06 Sensor (for measuring)
07 Measuring module
08 Glass dome
09 Opening
10 Mounting region
11 Electronics section
12 Sensor (for flight position)
13 Infrared camera system
14 Video camera system
15 Outer end of 16
16 One aerofoil
17 Meteorological measurement system
18 Outer end of 19
19 Other aerofoil
20 Electrical adjusting device
21 Aileron
22 Rear region of 01
23 Longitudinal axis of 01
24 Air guide surface
25 First air guide surface
26 Second air guide surface
27 Elevator
28 Rudder
29 Rear fin
30 Rechargeable battery
31 Computer-supported control device
32 Automatic flight management system
33 Stabilisation module
34 Evasion module
35 Malfunction module
36 Electromechanical malfunction system
37 Wireless data transmission device
38 Rear-mounted structure
39 Generator
40 Turbine
40A Servo motor
41 One end of 43
42 Servo arm
43 Servo control rod
44 Setting lever
45 First guide axis
46 Sliding block guide
47 First control axis
48 Lever arm
49 Second guide axis
50 Second control axis
51 Actuation axis
52 Angle lever
53 Third guide axis
54 Interlocking system
55 Tube
56 Interlock disc
57 First spiral spring
58 One end of 57
59 Recess in 56
60 Ratchet lever
61 Plunger
62 Electromagnetic coil
63 Second spiral spring
64 Lower end position in 46
65 Signal flag
66 Articulated lever
67 Joint
68 Third spiral spring
69 Upper end position in 46
70 Control surface (21, 27, 28)
71 Laser-supported distance measurement system
72 Radar-supported altitude measurement system
73 Satellite-supported positioning system
74 Fault detector
75 Tension spring
76 Landing flap
A First position of 47 (control position)
B Second position of 47 (locked position)

The invention claimed is:
1. A cylindrical active airborne platform for determining measurement data, the airborne platform comprising:
a middle region that is latchable to a carrying cable such that the airborne platform is towable through the air by a powered aircraft, sensors configured to determine the measurement data and a flight position of the airborne platform, two aerofoils arranged in the middle region of the airborne platform, which are adjustable and are connected to electrical adjusting devices so as to vary a vertical flight-position of the airborne platform, the electrical adjusting devices being configured as ailerons, a plurality of air guide surfaces arranged at a rear region of the airborne platform radially from a longitudinal axis of the airborne platform, opposing two first air guide surfaces and two second air guide surfaces of the plurality of air guide surfaces having further electrical adjusting devices, one of the further electrical adjusting devices for the two first air guide surfaces being configured as elevators and another of the further electrical adjusting devices for the two second air guide surfaces being configured as rudders, a computer-supported control device comprising an automatic flight management system that is configured to provide self-acting control of the vertical flight position of the airborne platform, and that is configured to control the further electrical adjusting devices, the flight management system comprising:

a malfunction module by which the ailerons, elevators and rudders are movable to respective non-deflected initial positions where the ailerons, elevators and rudders are locked, the malfunction module having an electromechanical malfunction system configured to be automatically activated in a state of failure of an electric power supply thereof, an evasion module by which the ailerons, elevators and rudders are automatically adjustable in such a manner that the airborne platform being towed avoids any obstacles determined by the sensors at a predetermined measurement frequency by optimally changing the flight position, and a stabilisation module by which the ailerons, elevators and rudders are automatically adjustable in such a manner that the flight position of the airborne platform being towed is stabilised, wherein during retrieval of the airborne platform underneath the aircraft, a measurement frequency of the sensors is increased depending on a distance between the airborne platform and the aircraft, and rechargeable batteries configured to supply electric power.

2. The airborne platform according to claim 1, wherein, from a distance of the airborne platform of 5 m from the aircraft, the measurement frequency is increased to 5 Hz.

3. The airborne platform according to claim 1, wherein the failure of the electric power supply of the electromechanical malfunction system is caused by the rechargeable batteries being depleted as a possible malfunction, by the response of a fault detector in other malfunctions or by manual intervention.

4. The airborne platform according to claim 1, wherein the malfunction system comprises an electromagnetic coil that, in a current-carrying state, holds a spring-loaded ratchet lever, and, in a non-current-carrying state, releases the ratchet lever, as a result of which a spring-loaded angle lever moves from a first position to a second position and by way of a first control axis, guided in a sliding block guide, the control axis is also moved to a second position by the angle lever, moves a lever arm, and a second control axis moves the ailerons, elevators and rudders to the locked non-deflected initial positions.

5. The airborne platform according to claim 4, wherein the malfunction system during activation automatically displays a clearly visible signal flag.

6. The airborne platform according to claim 1, wherein the sensors for determining the flight position of the airborne platform comprise at least one of a forward-looking infrared camera system, a video camera system, a laser-supported distance measurement system, a radar-supported altitude measurement system, a satellite-supported positioning system or a meteorological measurement system.

7. The airborne platform according to claim 1, further comprising an exchangeable measuring module disposed in a nose region of the airborne platform and having at least part of the sensors for acquisition of the measurement data.

8. The airborne platform according to claim 1, wherein at least the sensors for acquisition of the flight position are disposed on outer ends of the aerofoils.

9. The airborne platform according to claim 1, further comprising a wireless bi-directional data transmission device.

10. The airborne platform according to claim 1, wherein the two first air guide surfaces are arranged so as to be parallel, and the two second air guide surfaces are arranged so as to be orthogonal, to the aerofoils.

11. The airborne platform according to claim 1, further comprising fixed angled rear fins disposed on the two first air guide surfaces, the fixed angled rear fins being inclined by 4° to 6° relative to the longitudinal axis in a direction of a nose region of the airborne platform.

12. The airborne platform according to claim 11, wherein the fixed angled rear fins by inclined by 5° relative to the longitudinal axis.

13. The airborne platform according to claim 1, further comprising landing flaps disposed at least one of directly on the airborne platform or on rear fins, the landing flaps being controlled by the automatic flight management system.

14. The airborne platform according to claim 1, further comprising a fixed, truncated-cone-shaped rear-mounted structure disposed at the rear region of the airborne platform.

15. The airborne platform according to claim 1, further comprising a flow-driven generator configured to charge the rechargeable batteries during flight that is disposed at the rear region of the airborne platform.

* * * * *